United States Patent
Choi et al.

(10) Patent No.: US 7,868,972 B2
(45) Date of Patent: Jan. 11, 2011

(54) LIGHT SOURCE UNIT, LIQUID CRYSTAL DISPLAY HAVING THE SAME, AND METHOD THEREOF

(75) Inventors: Min-soo Choi, Cheonan-si (KR); Jae-eun Um, Cheonan-si (KR); Song-yi Han, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 348 days.

(21) Appl. No.: 12/025,847

(22) Filed: Feb. 5, 2008

(65) Prior Publication Data

US 2008/0198299 A1    Aug. 21, 2008

(30) Foreign Application Priority Data

Feb. 15, 2007 (KR) ............... 10-2007-0016051

(51) Int. Cl.
*G02F 1/1335* (2006.01)
(52) U.S. Cl. ........................................ 349/68
(58) Field of Classification Search ............. 349/69
See application file for complete search history.

(56) References Cited

U.S. PATENT DOCUMENTS 6,930,737 B2 * 8/2005 Weindorf et al. ......... 349/96
7,239,087 B2 * 7/2007 Ball ........................ 315/128
2006/0238466 A1 * 10/2006 Chen et al. .............. 345/82
2008/0018830 A1 * 1/2008 Negley .................... 349/69
2008/0143925 A1 * 6/2008 Kim et al. ................ 349/70
2009/0015759 A1 * 1/2009 Honbo ..................... 349/69

FOREIGN PATENT DOCUMENTS

JP         2004039684        2/2004
KR      1020040028976        4/2004

* cited by examiner

*Primary Examiner*—Sung H Pak
(74) *Attorney, Agent, or Firm*—Cantor Colburn LLP (57) ABSTRACT

A light source unit which can minimize current differences between a plurality of light emitting diodes ("LEDs") includes a printed circuit board ("PCB") which includes an active region that emits light and an inactive region that accounts for a remainder of the PCB, an LED array which includes a plurality of LEDs that are arranged at regular intervals, and a current balancing circuit which is disposed in the inactive region, generates a plurality of current balancing voltages by uniformly adjusting current differences between the LEDs, and outputs the current balancing voltages. A liquid crystal display ("LCD") including the light source unit, and a method of minimizing current differences between a plurality of LEDs are further provided.

27 Claims, 9 Drawing Sheets

LIGHT SOURCE UNIT, LIQUID CRYSTAL DISPLAY HAVING THE SAME, AND METHOD THEREOF

This application claims priority to Korean Patent Application No. 10-2007-0016051, filed on Feb. 15, 2007, and all the benefits accruing therefrom under 35 U.S.C. §119, the contents of which in its entirety are herein incorporated by reference.

BACKGROUND OF THE INVENTION

1. Field of the Invention

The present invention relates to a light source unit, a liquid crystal display ("LCD") having the same, and a method thereof. More particularly, the present invention relates to a light source unit which can minimize current differences between a plurality of light emitting diodes ("LEDs"), an LCD having the light source unit, and a method of minimizing current differences between LEDs.

2. Description of the Related Art

Liquid crystal displays ("LCDs") have a structure in which a liquid crystal layer is interposed between a common electrode display panel on which a reference electrode and color filters are formed and a thin film transistor ("TFT") substrate on which switching devices and pixel electrodes are formed. LCDs generate an electric field by applying different electrical potentials to pixel and reference electrodes, change the arrangement of liquid crystal molecules using the electric field, and adjust the transmittance of light, thereby displaying images.

Since liquid crystal molecules display images by changing the transmittance of light according to the direction and intensity of an electric field, LCDs need light for displaying images. Light emitting diodes ("LEDs"), cold cathode fluorescent lamps ("CCFLs"), and flat fluorescent lamps ("FFLs") have been used as light sources for LCDs.

Conventionally, CCFLs have been used as light sources for LCDs. However, an increasing number of LCDs are using FFLs or LEDs. In particular, LEDs have recently been widely adopted for use in LCDs because of their low power consumption and high luminance.

In general, different LEDs require different forwarding voltages. Therefore, an LED driving circuit must be designed such that the same current can flow into all LEDs. For this, a plurality of LEDs may be connected in series to one another so that the same current can flow into the LEDs.

However, extremely high voltages are generally needed for hundreds of LEDs that are connected in series, and it is difficult to design LED driving circuits capable of generating such high voltages.

BRIEF SUMMARY OF THE INVENTION

The present invention provides a light source unit which can minimize current differences between a plurality of light emitting diodes ("LEDs").

The present invention also provides a liquid crystal display ("LCD") having a light source unit which can minimize current differences between a plurality of LEDs.

The present invention also provides a method of minimizing current differences between a plurality of LEDs.

According to exemplary embodiments of the present invention, there is provided a light source unit, including a printed circuit board ("PCB") which includes an active region that emits light and an inactive region that accounts for a remainder of the PCB, an LED array which includes a plurality of LEDs that are arranged at regular intervals, and a current balancing circuit which is disposed in the inactive region, generates a plurality of current balancing voltages by uniformly adjusting current differences between the LEDs, and outputs the current balancing voltages.

According to other exemplary embodiments of the present invention, there is provided an LCD, including a liquid crystal panel assembly which includes a liquid crystal panel that displays images and a first PCB that generates a plurality of driving signals for driving the liquid crystal panel and that provides the driving signals to the liquid crystal panel, and a backlight unit which includes a light source unit. The light source unit includes a second PCB which includes an active region that emits light and an inactive region that accounts for a remainder of the second PCB, an LED array which includes a plurality of LEDs that are arranged at regular intervals, and a current balancing circuit which is disposed in the inactive region, generates a plurality of current balancing voltages by uniformly adjusting current differences between the LEDs, and outputs the current balancing voltages.

According to still other exemplary embodiments of the present invention, there is provided a method of minimizing current differences between a plurality of LEDs in a light source unit, the light source unit including a PCB having an active region, upon which the LEDs are disposed in channels, and an inactive region, the method including providing forwarding voltages from an LED driving circuit to each channel of LEDs, sending LED voltages from each channel of LEDs to a current balancing circuit disposed on the inactive region of the PCB, uniformly adjusting current differences between the LEDs in the current balancing circuit, outputting current balancing voltages from the current balancing circuit to the LED driving circuit, comparing the current balancing voltages to a reference voltage in the LED driving circuit, and controlling the forwarding voltages based on comparison of the current balancing voltages to the reference voltage in the LED driving circuit.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. Like reference numerals in the drawings denote like elements, and thus their description will be omitted.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

Hereinafter, the present invention will be described in detail with reference to the accompanying drawings.

Figure 1:
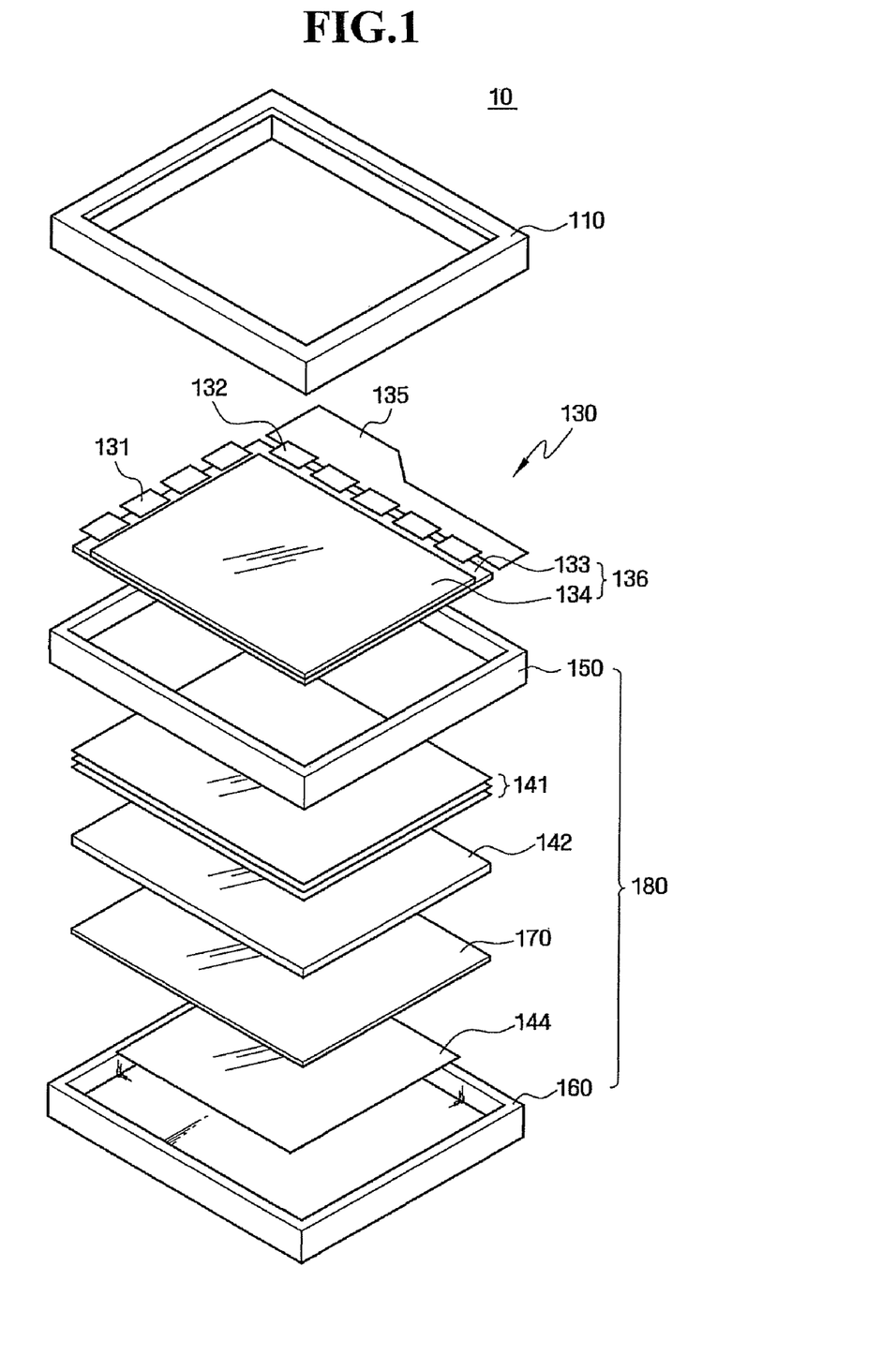
FIG. 1 is an exploded perspective view of an exemplary liquid crystal display ("LCD") according to an exemplary embodiment of the present invention.

FIG. 1 is an exploded perspective view of an exemplary liquid crystal display ("LCD") 10 according to an exemplary embodiment of the present invention. Referring to FIG. 1, the LCD 10 includes a liquid crystal panel assembly 130, a backlight assembly 180, and an upper container 110.

The liquid crystal panel assembly 130 includes a liquid crystal panel 136, a liquid crystal layer (not shown), a plurality of gate tape carrier packages ("TCPs") 131, a plurality of data TCPs 132, and a printed circuit board ("PCB") 135. The liquid crystal panel 136 includes a thin film transistor ("TFT") display panel 133 and a common electrode display panel 134.

More specifically, the liquid crystal panel 136 includes a TFT display panel 133 including gate lines (not shown), data lines (not shown), an array of TFTs (not shown), and pixel electrodes (not shown). The common electrode display panel 134 includes black matrix layers (not shown) and a common electrode (not shown). The common electrode display panel 134 is disposed to face the TFT display panel 133.

The gate TCPs 131 are respectively connected to the gate lines on the TFT display panel 133, and the data TCPs 132 are respectively connected to the data lines on the TFT display panel 133.

Various driving devices for processing gate driving signals and data driving signals are mounted on the PCB 135 so that the gate driving signals and the data driving signals are input to the gate TCPs 131 and the data TCPs 132, respectively.

The backlight assembly 180 includes optical sheets 141, an optical plate 142, a light source unit 170, and a reflection plate 144.

The light source unit 170 includes an array of a plurality of light emitting diodes ("LEDs"). The LEDs may be arranged in a direct-type. The LEDs generate light in response to a plurality of forwarding voltages applied thereto from an external source. This will be further described below with reference to FIG. 2.

The optical plate 142 may be disposed on the light source unit 170. The optical plate 142 improves the luminance uniformity of light emitted by the LEDs in the light source unit 170.

The reflection plate 144 is disposed under the light source unit 170 and reflects light upward from below the light source unit 170. The reflection plate 144 may be formed in one body with the bottom of a lower container 160. The optical sheets 141 are disposed on the optical plate 142, and diffuse and focus light transmitted by the light source unit 170. The optical sheets 141 may include a diffusion sheet, a first prism sheet, and a second prism sheet.

The diffusion sheet is disposed on the light source unit 170 and improves the luminance and the luminance uniformity of light incident thereupon from the light source unit 170.

The first prism sheet is disposed on the diffusion sheet. A plurality of prism patterns (not shown) are uniformity arranged on a surface of the first prism sheet to focus light diffused from the diffusion sheet and to output the focused light. The second prism sheet is disposed on the first prism sheet. The second prism sheet is a multi-layered reflective, polarization prism sheet for focusing, polarizing, and outputting light. If the first prism sheet can guarantee sufficient luminance and viewing angles, the second prism sheet may be omitted. While a particular arrangement of the optical sheets 141 has been described, alternate arrangements and elements therein would also be within the scope of these embodiments.

The backlight assembly 180 includes a container frame 150 and the lower container 160 which can contain the optical sheets 141, the optical plate 142, the light source unit 170, and the reflection plate 144.

The liquid crystal assembly 130 is disposed on the optical sheets 141, and is received in the lower container 160 in a state in which it is supported by the container frame 150.

The container frame 150 has sidewalls formed along its rectangular-shaped edges. The container frame 150 may be constructed such that the liquid crystal panel assembly 130 can be supported by stepped portions or protrusions formed inside the sidewalls.

The lower container 160 has sidewalls formed along the edges of its rectangular-shaped upper surface, and securely receives the backlight assembly 180 and the liquid crystal panel assembly 130 in an area defined by the sidewalls. Also, the lower container 160 serves to protect the optical sheets 141.

The PCB 135 of the liquid crystal panel assembly 130 is folded along an outer edge of the lower container 160 so that it is disposed on a sidewall or a rear surface of the lower container 160. The lower container 160 can have a variety of shapes, depending on how the backlight assembly 180 or the liquid crystal panel assembly 130 is placed in the lower container 160.

The lower container 160 is coupled to the upper container 110 so that an upper peripheral surface of the liquid crystal panel assembly 130 received in the lower container 160 is covered.

Figure 2:
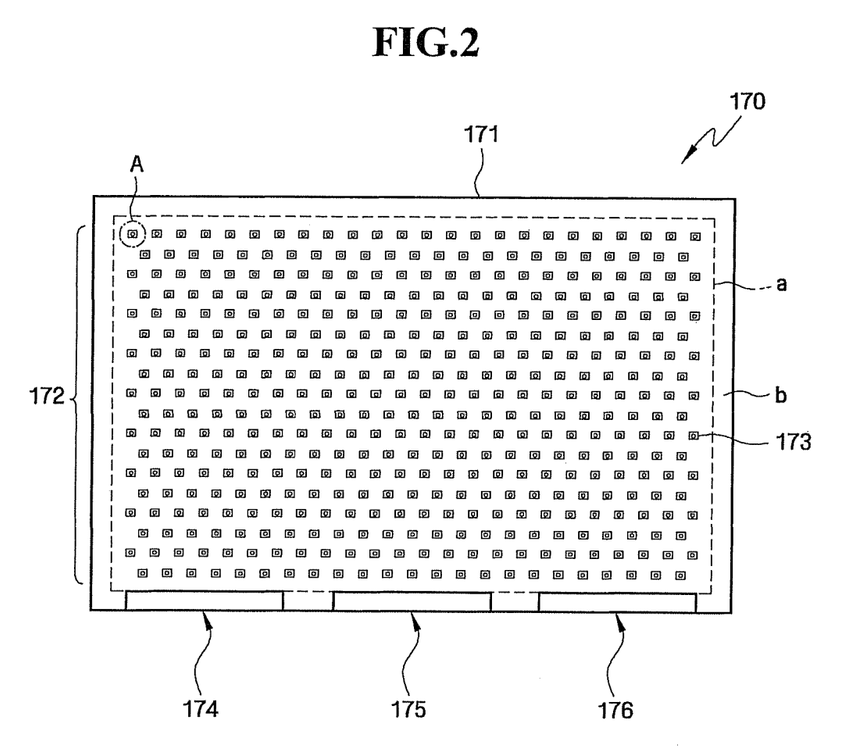
FIG. 2 is a plan view of an exemplary light source unit illustrated in FIG. 1.
Figure 3:
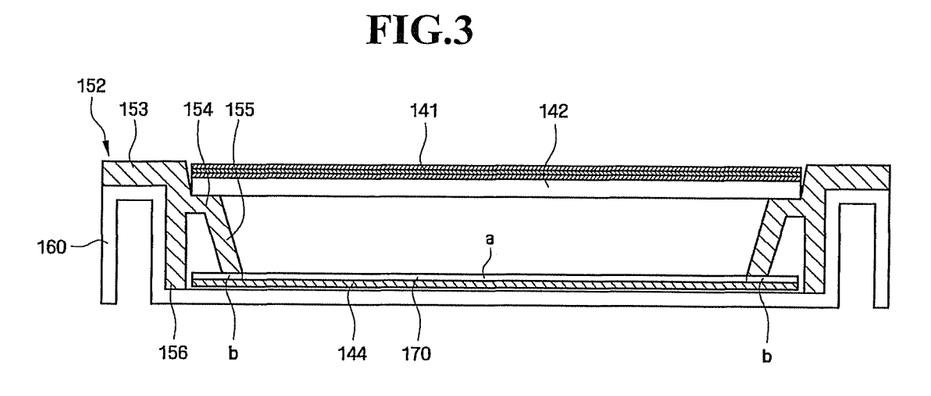
FIG. 3 is a cross-sectional view showing a connection between the exemplary light source unit illustrated in FIG. 1 and an exemplary side mold.
Figure 4:
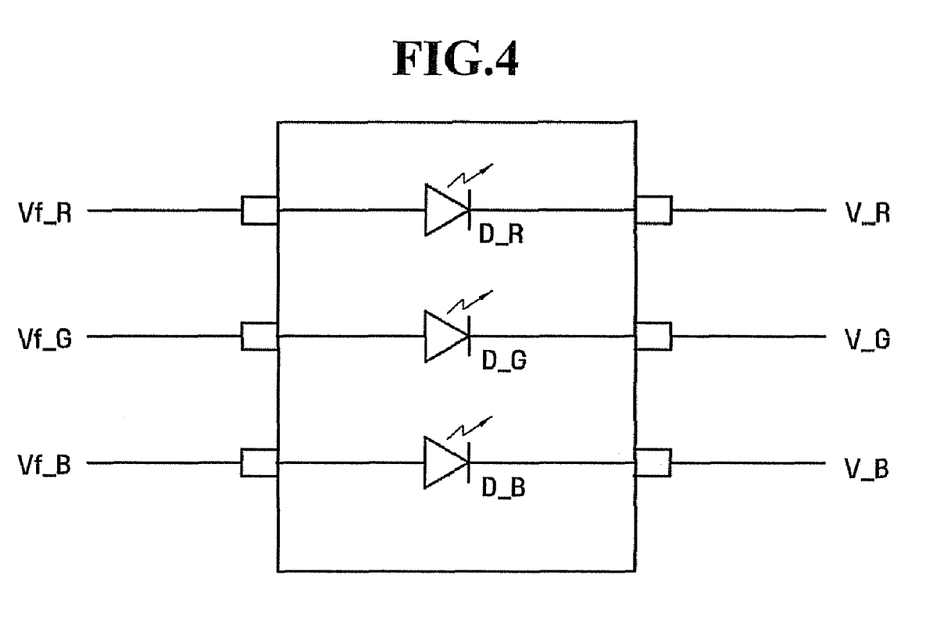
FIG. 4 is an enlarged view of portion A of FIG. 2.

FIG. 2 is a top view of the exemplary light source unit 170 illustrated in FIG. 1, FIG. 3 is a cross-sectional view showing a connection between the exemplary light source unit 170 and an exemplary side mold 152, and FIG. 4 is an enlarged view of portion A of FIG. 2.

Referring to FIG. 2, the light source unit 170 includes an LED PCB 171, an LED array 172, and first through third current balancing circuits 174 through 176.

The LED PCB 171 includes an active region a corresponding to where images are displayed on the liquid crystal panel 136, and an inactive region b which accounts for the remaining area of the LED PCB 171, which may border the active region a.

The active region a includes the LED array 172. The LED array 172 includes a plurality of LEDs 173 which are arranged at regular intervals. The LEDs 173 may be arranged along a row direction of the liquid crystal panel 136. In an exemplary embodiment, each of the LEDs 173 includes red (R), green (G), and blue (B) sub-LEDs, as will be described with respect to FIG. 4.

Referring to FIG. 4, an LED 173 includes R, G, and B sub-LEDs D_R, D_G, and D_B which are arranged in parallel. The LED 173 generates light by being provided with first, second, and third forwarding voltages $Vf\_R$, $Vf\_G$, and $Vf\_B$ by an external source. The LED 173 outputs first, second, and third LED voltages $V\_R$, $V\_G$, and $V\_B$. The first, second, and third forwarding voltages $Vf\_R$, $Vf\_G$, and $Vf\_B$ are minimum voltages that are required to drive the LED 173, and may vary according to the type of the LED 173. In general, the first, second, and third forwarding voltages $Vf\_R$, $Vf\_G$, and $Vf\_B$ may be within the range of about 2 to about 4 V.

Referring again to FIG. 2, the first through third current balancing circuits 174 through 176 are disposed in the inactive region b of a lower portion of the LED PCB 171. The first through third current balancing circuits 174 through 176 uniformly adjust current differences between the LEDs 173.

Referring to FIGS. 2 and 3, the lower portion or an opposite upper portion of the inactive region b of the LED PCB 171 may be covered by a side mold 152 during subsequent assembly processes of the LCD 10. Therefore, the first, second and third current balancing circuits 174, 175, and 176 may be disposed in the inactive region b along a transverse direction defining either one of or both of the inactive region b for the lower and upper portions of the LED PCB 171. That is, the first, second and third current balancing circuits 174, 175, and 176 may be disposed, along the transverse direction, in either the upper portion or the lower portion of the inactive region b or in both the upper portion and the lower portion of the inactive region b.

The side mold 152 may include a top surface 153, an external sidewall 156 which meets the top surface 153 at right angles, and an internal sidewall 155 which is connected to the external sidewall 156, such as via a supporting step 154. The internal sidewall 155 may be a downwardly slanted internal sidewall which extends from the external sidewall 156. The internal sidewall 155 may contact the light source unit 170 on the inactive region b. The internal sidewall 155 includes the supporting step 154. The supporting step 154 has a predetermined step difference with the top surface 153 of the side mold 152. The optical sheets 141 and the optical plate 142 may be mounted on the supporting step 154.

Figure 5:
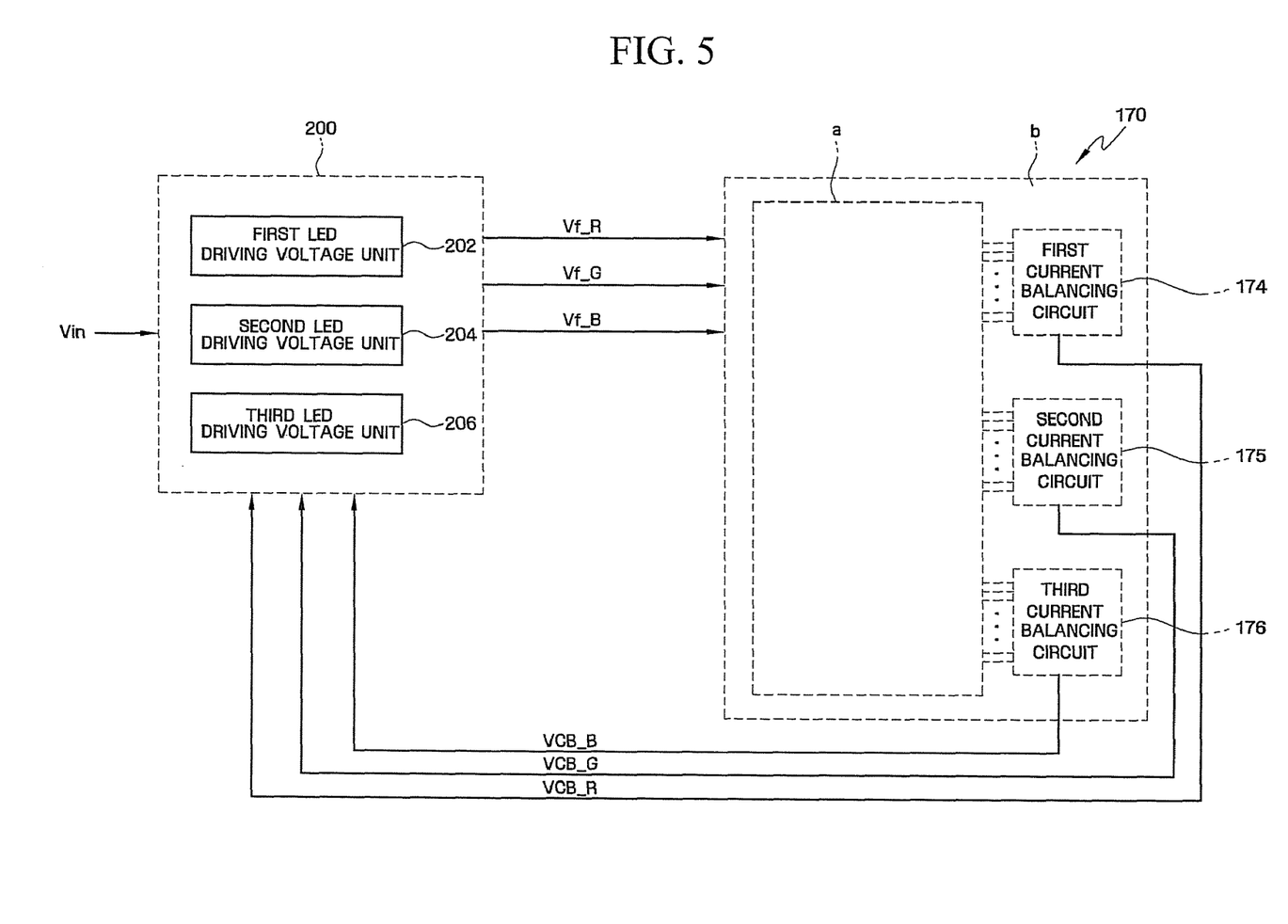
FIG. 5 is a block diagram showing the structures and operations of an exemplary light emitting diode ("LED") driving circuit and first through third exemplary current balancing circuits, according to an exemplary embodiment of the present invention.
Figure 6:
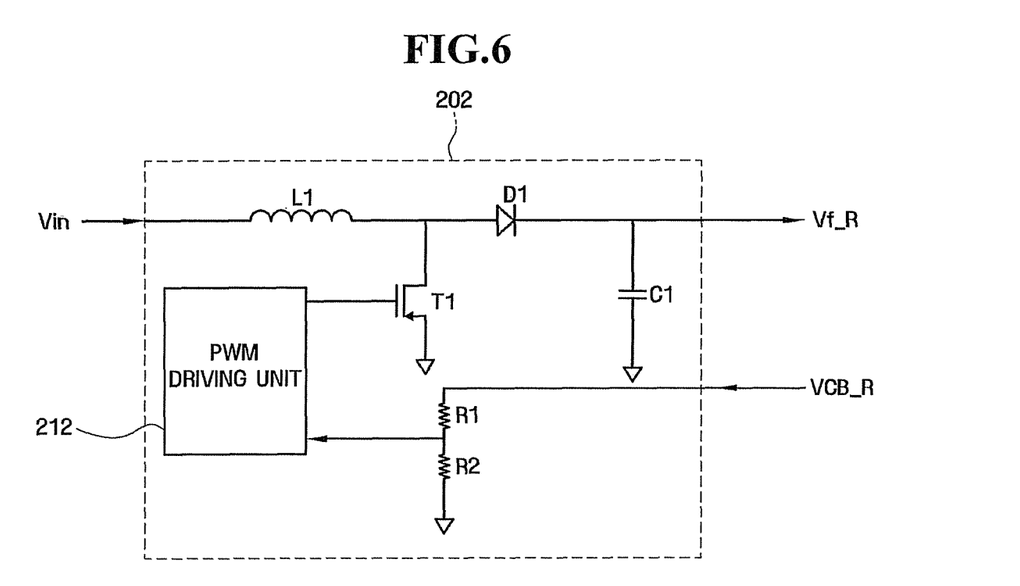
FIG. 6 is a circuit diagram of an exemplary first LED driving voltage generation unit illustrated in FIG. 5.
Figure 7:
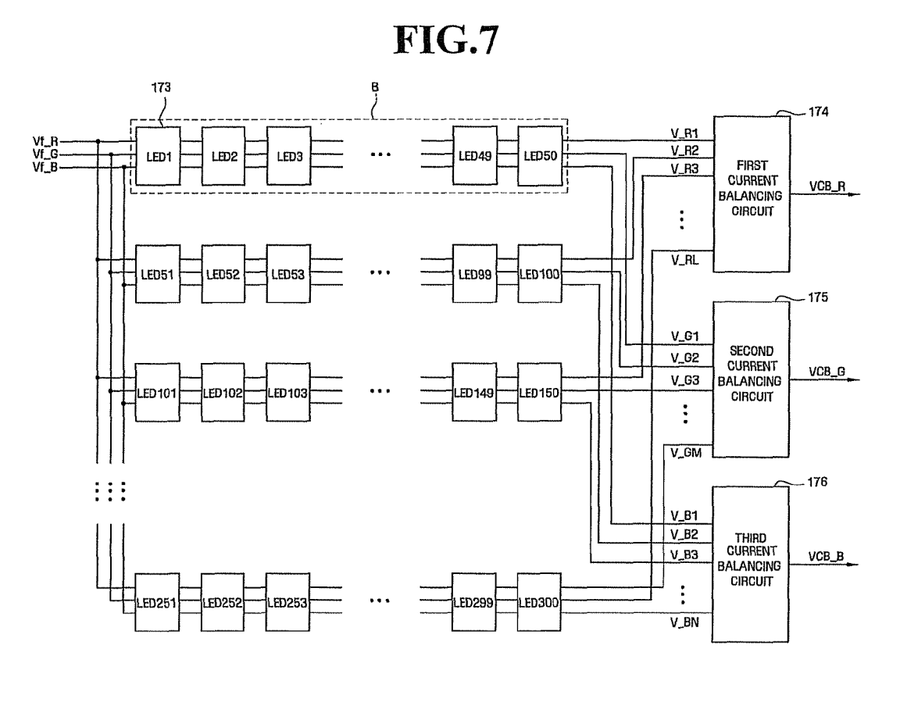
FIG. 7 is a block diagram of the exemplary first current balancing circuit illustrated in FIG. 5.

FIG. 5 is a block diagram showing the structures and operations of an exemplary LED driving circuit 200 and the exemplary first through third current balancing circuits 174 through 176 illustrated in FIG. 2, FIG. 6 is a circuit diagram of an exemplary first LED driving voltage generation unit 202 illustrated in FIG. 5, and FIG. 7 is a block diagram of the exemplary first current balancing circuit 174 illustrated in FIG. 5.

Referring to FIG. 5, the LED driving circuit 200 includes first, second, and third LED driving voltage generation units 202, 204, and 206.

The first, second, and third LED driving voltage generation units 202, 204, and 206 are provided with an input voltage Vin by an external source, and respectively generate first, second, and third forwarding voltages $Vf\_R$, $Vf\_G$, and $Vf\_B$. The first, second, and third forwarding voltages $Vf\_R$, $Vf\_G$, and Vf_B may be respectively provided to R, G, and B sub-LEDs D_R, D_G, and D_B of each of the LEDs 173 in the active region a of the light source unit 170.

Referring to FIG. 6, the first LED driving voltage generation unit 202 includes an inductor L1 to which the input voltage Vin is applied, a diode D1 which is connected to the inductor L1, a capacitor C1 which is connected to the diode D1, a switching device T1 which is connected between the inductor L1 and the diode D1, a pulse width modulation ("PWM") driving unit 212 which is connected to the switching device T1, and resistors R1 and R2 which are connected in series to each other and are connected to the PWM driving unit 212.

When the switching device T1 is turned off, a current provided by the input voltage Vin is provided to the LED array 172 of the light source unit 170 via the inductor L1 and the diode D1 as a first forwarding voltage Vf_R. A current that flows through the diode D1 is applied to each R-sub LED D_R, as illustrated in FIG. 4. On the other hand, when the switching device T1 is turned on, the current provided by the input voltage Vin is blocked so that no current can flow into the LED array 172 of the light source unit 170.

The PWM driving unit 212 controls the flow of a current in order to adjust the brightness of the LEDs 173. The PWM driving unit 212 receives a first current balancing voltage VCB_R from the first current balancing circuit 174, which is applied to the resistors R1 and R2 that sense a current, and compares the first current balancing voltage VCB_R with an internal reference voltage. Thereafter, the PWM driving unit 212 outputs a control signal that either turns on or off the switching device T1 according to the result of the comparison.

When an image to be displayed does not need red light, then G and B sub-LEDs are respectively provided with the second and third forwarding voltages Vf_G and Vf_B, whereas R sub-LEDs are not provided with the first forwarding voltage Vf_R. As a result, the R-sub LEDs are turned off only for a short time.

The second and third LED driving voltage generation units 204 and 206 may have the same structure as the first LED driving voltage generation unit 202, but the present invention is not restricted to this.

Referring to FIG. 5, the light source unit 170 includes the first, second, and third current balancing circuits 174, 175, and 176 which respectively generate and output first, second, and third current balancing voltages VCB_R, VCB_G, and VCB_B by uniformly adjusting current differences between the LEDs 173. Also, the light source unit 170 is provided with the first, second, and third forwarding voltages Vf_R, Vf_G, and Vf_B by the first, second, and third LED driving voltage generation units 202, 204, and 206 of the LED driving circuit 200, respectively, and applies the first, second, and third forwarding voltages Vf_R, Vf_G, and Vf_B to the LEDs 173 illustrated in FIG. 7.

With reference to FIG. 7, the LED array 172 of the light source unit 170 includes a plurality of channels, each channel including an array of a plurality of LEDs 173 that are connected in series in a row direction. For example, a first LED LED1 in a first channel B is provided with the first, second, and third forwarding voltages Vf_R, Vf_G, and Vf_B by the LED driving circuit 200. Referring to FIG. 4, an R sub-LED D_R of the first LED LED1 in the first channel B is provided with the first forwarding voltage Vf_R, generates light, and outputs a first LED voltage V_R. A G sub-LED D_G of the first LED LED1 is provided with the second forwarding voltage Vf_G, generates light, and outputs a second LED voltage V_G. A B sub-LED D_B of the first LED LED1 is provided with the third forwarding voltage Vf_B, generates light, and outputs a third LED voltage V_B. In this manner, R, G, and B sub-LEDs of an LED LED50, which is the last LED in the first channel B, respectively output first, second, and third LED voltages V_R1, V_G1, and V_B1.

Eventually, the LED LED50, an LED LED100, an LED LED150, . . . , and an LED LED300, which are the last LEDs in their respective channels, output first LED voltages V_R1, V_R2, V_R3, . . . , and V_RL, respectively, second LED voltages V_G1, V_G2, V_G3, . . . , and V_GM, respectively, and third LED voltages V_B1, V_B2, V_B3, . . . , and V_BN, respectively. While each channel of the light source unit 170 is described as having fifty LEDs, it should be understood that alternative exemplary embodiments of the light source unit 170 may include a different number of LEDs per channel. The first, second, and third current balancing circuits 174, 175, and 176 are provided with the first LED voltages V_R1, V_R2, V_R3, . . . , and V_RL, the second LED voltages V_G1, V_G2, V_G3, . . . , and V_GM, and the third LED voltages V_B1, V_B2, V_B3, . . . , and V_BN, respectively. The first LED voltages V_R1, V_R2, V_R3, . . . , and V_RL are the voltages that are respectively output by the R sub-LEDs of the LEDs LED50, LED100, LED150, . . . , and LED300. The second LED voltages V_G1, V_G2, V_G3, . . . , and V_GM are the voltages that are respectively output by the G sub-LEDs of the LEDs LED50, LED100, LED150, . . . , and LED300. The third LED voltages V_B1, V_B2, V_B3, . . . , and V_BN are the voltages that are respectively output by the B sub-LEDs of the LEDs LED50, LED100, LED150, . . . , and LED300.

Figure 8:
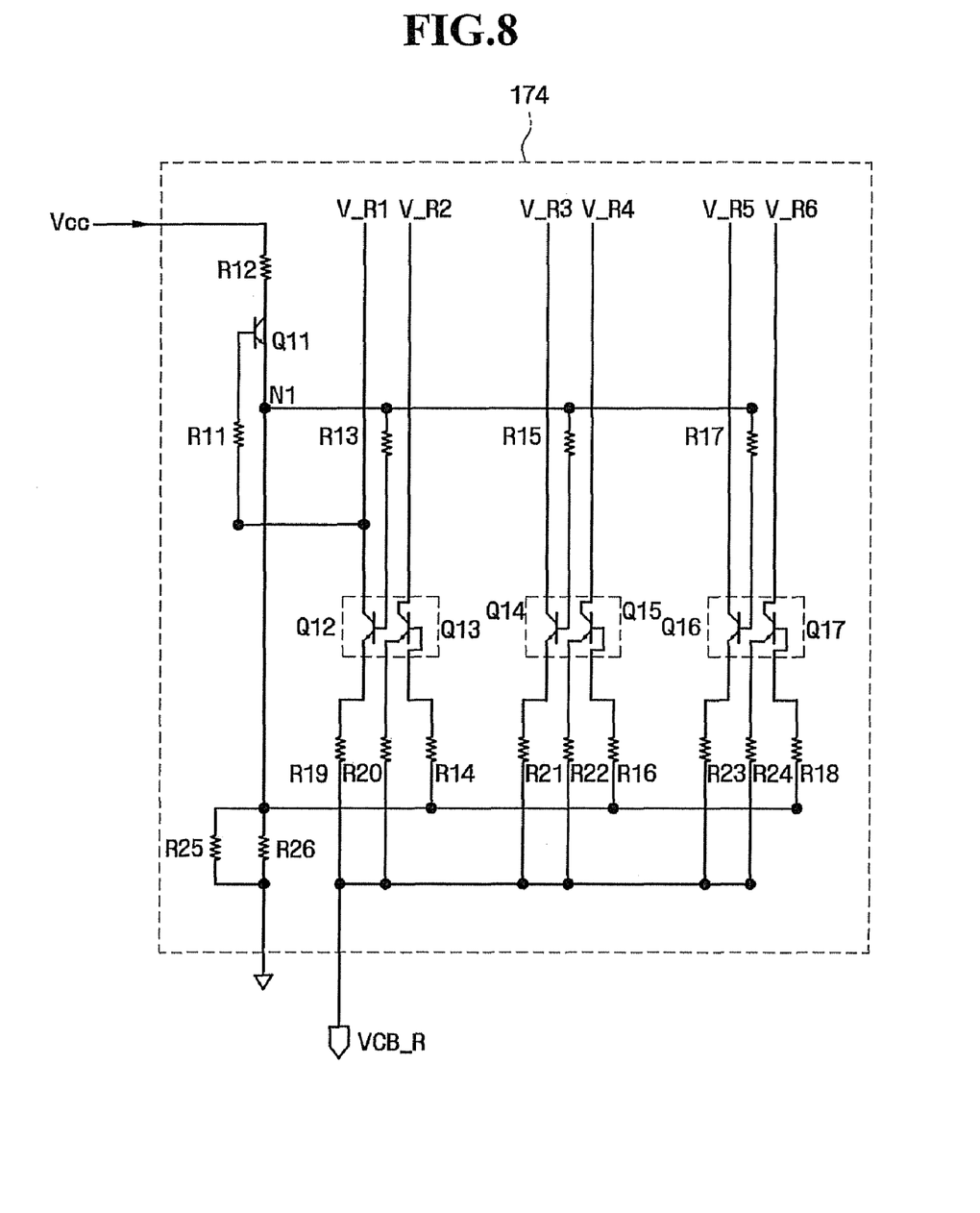
FIG. 8 is a circuit diagram of the exemplary first current balancing circuit according to a first exemplary embodiment of the present invention.
Figure 9:
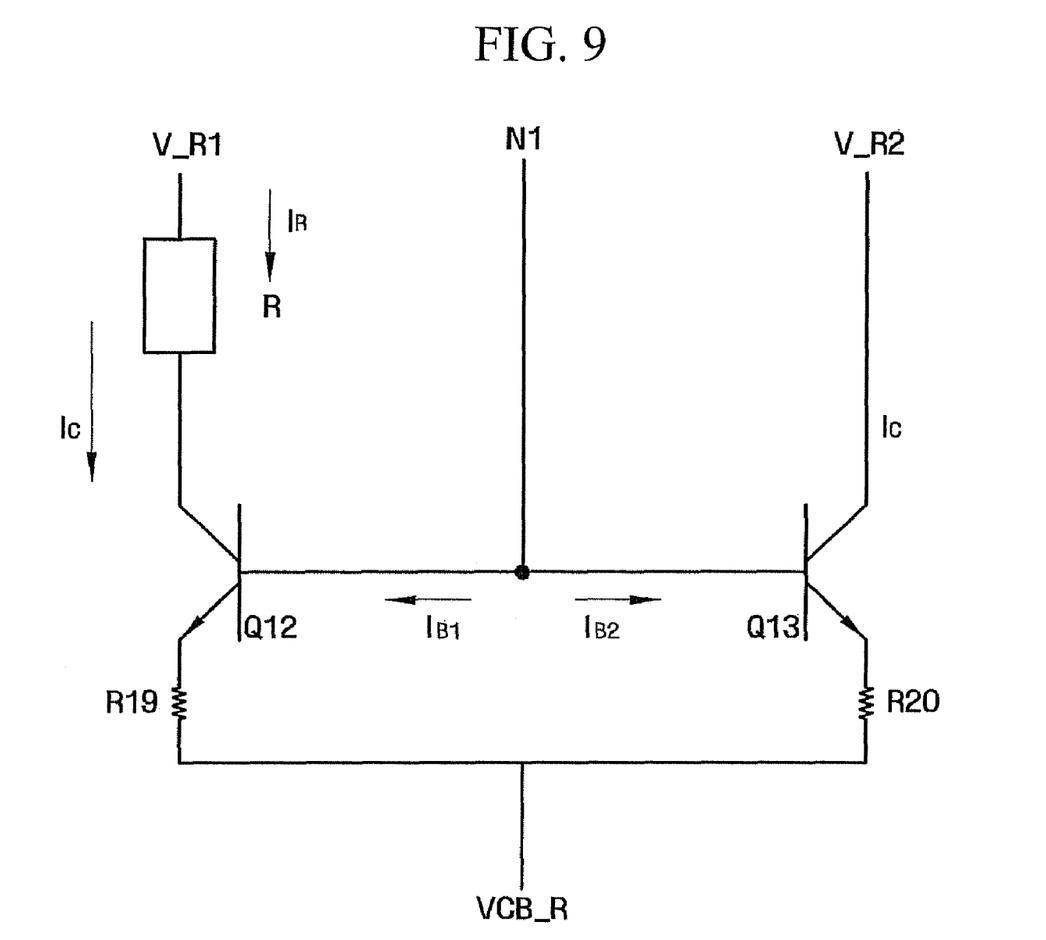
FIG. 9 is a circuit diagram showing the operation of an exemplary current mirror circuit illustrated in FIG. 8.

FIG. 8 is a circuit diagram of the exemplary first current balancing circuit 174 according to a first exemplary embodiment of the present invention and FIG. 9 is a circuit diagram for showing the operation of an exemplary current mirror circuit illustrated in FIG. 8. As an exemplary embodiment, the light source unit 170 is described as including six channels, however an alternate number of channels would also be within the scope of these embodiments.

Referring to FIG. 8, the first current balancing circuit 174 is provided with a power supply voltage Vcc and first LED voltages V_R1, V_R2, V_R3, V_R4, V_R5, and V_R6 by an external source. The first LED voltages V_R1, V_R2, V_R3, V_R4, V_R5, and V_R6 are the voltages respectively output by the last LEDs of the six channels. The first current balancing circuit 174 includes a first switching device Q11, a plurality of second switching devices Q12 through Q17, a first resistor R11, a second resistor R12, a plurality of third resistors R13 through R18, a plurality of fourth resistors R19 through R24, a fifth resistor R25, and a sixth resistor R26.

The first LED voltage V_R1 is applied to the base, such as the control terminal, of the first switching device Q11 via the first resistor R11, and the power supply voltage Vcc is applied to the collector, such as the input terminal, of the first switching device Q11. The first switching device Q11 is turned on in response to the first LED voltage V_R1.

The voltage of the emitter, such as the output terminal, of the first switching device Q11 is applied to the bases, such as the control terminals, of the second switching devices Q12 through Q17 via the third resistors R13 through R18, and the first LED voltages V_R1, V_R2, V_R3, V_R4, V_R5, and V_R6 are respectively input to the collectors, such as the input terminals, of the second switching devices Q12 through Q17. The second switching devices Q12 through Q17 are turned on in response to the emitter voltage of the first switching device Q11. First ends of the fourth resistors R19 through R24 are respectively connected to the emitters, such as the output terminals, of the second switching devices Q12 through Q17. Second ends of the fourth resistors R19 through R24 are connected to the same node.

First ends of the fifth and sixth resistors R25 and R26 are connected to the emitter of the first switching device Q11. Second ends of the fifth and sixth resistors R25 and R26 are grounded. The fifth and sixth resistors R25 and R26 are connected in parallel.

The first current balancing circuit 174 performs current balancing using a current mirror circuit.

The first LED voltage V_R1, which is output by the first channel B as shown in FIG. 7, is applied to the base of the first switching device Q11 via the first resistor R11, as shown in FIG. 8. The first switching device Q11 is turned on in response to the first LED voltage V_R1. When the first switching device Q11 is turned on, the emitter voltage of the first switching device Q11 is provided to the bases of the second switching devices Q12 through Q17 via a node N1. The voltage at the base of the first switching device Q11 may vary according to the resistance value of the first resistor R11. The third resistors R13 through R18 and the fourth resistors R19 through R24 may have the same resistance value.

A current mirror operation according to a first exemplary embodiment of the present invention will hereinafter be described in detail with reference to FIG. 9, focusing on the second switching devices Q12 and Q13 illustrated in FIG. 8. The second switching devices Q12 and Q13 may be rearranged as illustrated in FIG. 9.

The second switching devices Q12 and Q13 serve as amplifiers in an active region. The bases of the second switching devices Q12 and Q13 are connected to the same node, i.e., the node N1 that is also connected to the emitter of the first switching device Q11. In this case, a very low voltage is applied to the bases of the second switching devices Q12 and Q13. The second switching devices Q12 and Q13 have the same characteristic. That is, the second switching devices Q12 and Q13 have the same current gain, i.e., a current gain β. The second switching devices Q12 and Q13 also have the same collector current, i.e., a collector current $I_C$. The collector current $I_C$ may be represented by Equation (1):

$$I_C = \beta \cdot I_B \quad (1)$$

Since the bases of the second switching devices Q12 and Q13 are both connected to the node N1, currents $I_{B1}$ and $I_{B2}$ that respectively flow into the bases of the second switching devices Q12 and Q13 are equal. According to Kirchoff's Voltage Law and Kirchoff's Current Law, the collector current IC may also be represented by Equation (2):

$$I_C = (\beta/(\beta+2)) \cdot (V\_R1 - V_{BE})/R \quad (2)$$

Therefore, the collector current $I_C$ of the second switching devices Q12 and Q13 is determined by the current gain β, the first LED voltage V_R1, and resistance R. A voltage $V_{BE}$ which is applied to the bases and emitters of the second switching devices Q12 and Q13 is a constant. Since the current gain β is greater than 1, the collector current $I_C$ is solely determined by the first LED voltage V_R1, which is provided by an external source, and the resistance R and is thus uniform. For example, if the first LED voltage V_R1 is 2.8 V, the voltage $V_{BE}$ is 0.7 V, the resistance R is 10 KΩ and the current gain β is 100, then the collector $I_C$ may be determined to be 0.20588 mA according to Equation (2). If the current gain β is 200, the collector $I_C$ may be determined to be 0.20792 mA. Thus, even when the current gain β is varied by 100, the collector current $I_C$ is varied, but only by 0.00204 mA. Therefore, the collector current $I_C$ is almost uniform. The resistors R19 and R20 sense a current. While a current mirror operation has been described with respect to second switching devices Q12 and Q13, the same current mirror operation may also apply to remaining second switching devices in the first current balancing circuit 174, such as second switching devices Q14 to Q17.

Figure 10:
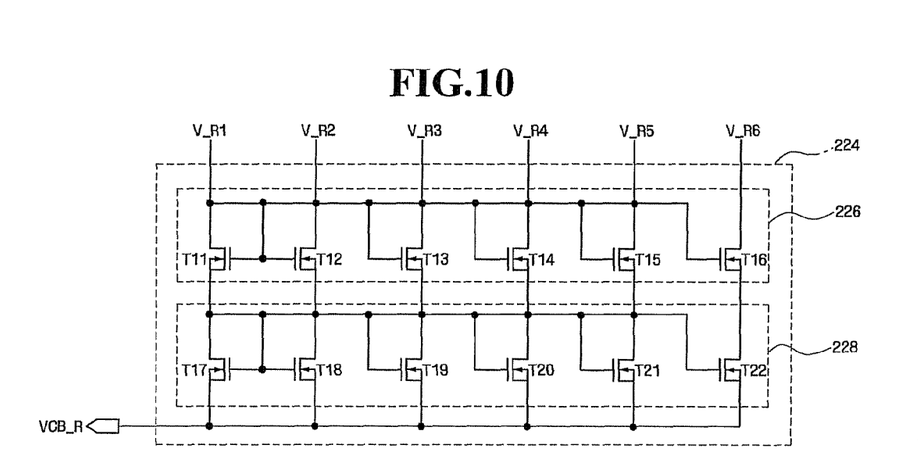
FIG. 10 is a circuit diagram of the exemplary first current balancing circuit according to a second exemplary embodiment of the present invention.

FIG. 10 is a circuit diagram of the exemplary first current balancing circuit according to a second exemplary embodiment of the present invention. Referring to FIG. 10, the first current balancing circuit 224 is provided with first LED voltages V_R1, V_R2, V_R3, V_R4, V_R5, and V_R6, which are respectively output by the last LEDs of six channels of light source unit 170. The first current balancing circuit 224 includes a first stage current mirror 226 and a second stage current mirror 228. The first stage current mirror 226 includes a plurality of first switching devices T11 through T16, and the second stage current mirror 228 includes a plurality of second switching devices T17 through T22.

More specifically, the first LED voltages V_R1, V_R2, V_R3, V_R4, V_R5, and V_R6 are applied to first sources, such as input terminals, of the first switching devices T11 through T16 and to first gates, such as control terminals, of the first switching devices T11 through T16. The first gates and the first sources of the first switching devices T11 through T15 are connected to the same nodes.

Second sources, such as input terminals, of the second switching devices T17 through T22 are connected to first drains, such as output terminals, of the first switching devices T11 through T16. The voltages applied to the second sources of the second switching devices T17 through T22 are respectively the same as the voltages applied to the second gates, such as control terminals, of the second switching devices T17 through T22. The second gates and the second sources of the second switching devise T17 through T21 are connected to the same nodes.

Current balancing may be performed on LEDs with different forwarding voltages using a current mirror circuit that includes the first switching devices T11 through T16.

The first LED voltage V_R1 is applied to first gates of the first switching devices T11 through T16, and a current that flows into the first switching device T11 is mirrored. The first LED voltage V_R1 which determines the current of the first switching device T11 may be the same as the first LED voltages V_R2, V_R3, V_R4, V_R5, and V_R6.

If the first LED voltage V_R1 is lower than the first LED voltages V_R2, V_R3, V_R4, V_R5, and V_R6, the voltage margin for the first LED voltages V_R2, V_R3, V_R4, V_R5, V_R6 may decrease, and thus, the first switching devices T11 through T16 may not be able to properly operate. The first LED voltage V_R1 may be increased simply by, for example, using whichever of the last LEDs in the six channels has a relatively high forwarding voltage. In this case, it is possible to address the problem of first LED voltage shortage.

If a current mirror is designed using a plurality of switching devices having the same characteristics, such as previously described with respect to FIG. 9, then the current mirror may supply the first switching devices T11 through T16 with the same current. In this case, second drains of the second switching devices T17 through T22 are connected to a single node and are thus supplied with the same current via the single node. A voltage applied to the single node is a first current balancing voltage VCB_R. The first current balancing voltage VCB_R is provided to the LED driving circuit 200, as illustrated in FIG. 5.

The first current balancing circuit 224 may include the first stage current mirror 226 only. Alternatively, the first current balancing circuit 224 may include both the first stage current mirror 226 and the second stage current mirror 228 in consideration of the differences between a plurality of switching devices and the power consumption of the switching devices.

Figure 11:
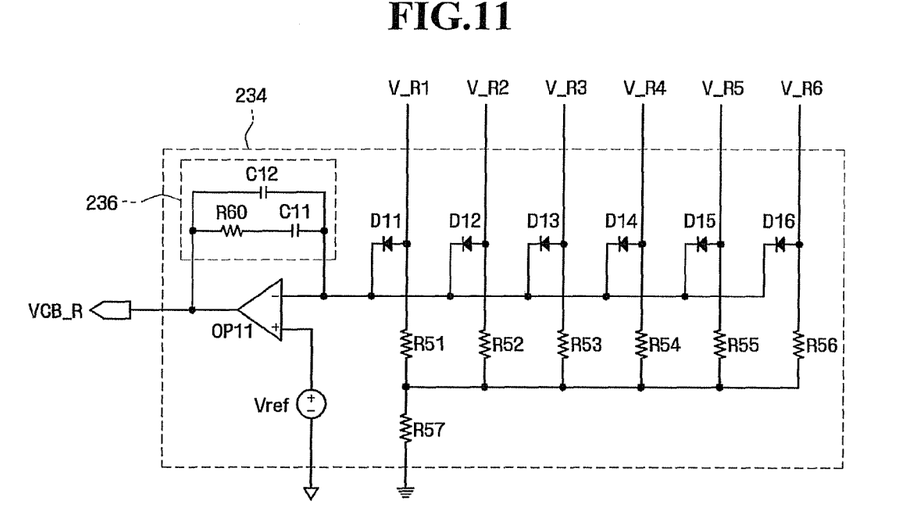
FIG. 11 is a circuit diagram of the exemplary first current balancing circuit according to a third exemplary embodiment of the present invention.

FIG. 11 illustrates a circuit diagram of the exemplary first current balancing circuit according to a third exemplary embodiment of the present invention. Referring to FIG. 11, the first current balancing circuit 234 is provided with a plurality of first LED voltages V_R1, V_R2, V_R3, V_R4, V_R5, and V_R6, which are respectively output by the last LEDs of the six channels of the light source unit 170. The first current balancing circuit 234 includes a plurality of diodes D11 through D16, a plurality of first resistors R51 through R56, a second resistor R57, an operational amplifier OP11, and a ripple remover 236.

The first LED voltages V_R1, V_R2, V_R3, V_R4, V_R5, and V_R6 are respectively applied to the anodes of the diodes D11 through D16. The cathodes of the diodes D11 through D16 are connected to the same node.

A highest LED voltage among the first LED voltages V_R1, V_R2, V_R3, V_R4, V_R5, and V_R6 is applied to the cathode of the diode D11. For example, if the first LED voltage V_R1 is the highest voltage, the first LED voltage V_R1 may be applied to the cathode of the diode D11.

First ends of the first resistors R51 through R56 are respectively connected to the anodes of the diodes D11 through D16, and second ends of the first resistors R51 through R56 are connected to the same node. A first end of the second resistor R57 is connected to the second ends of the first resistors R51 through R56 in series, and a second end of the second resistor R57 is grounded.

An inverting terminal (−) of the operational amplifier OP11 is connected to the cathodes of the diodes D11 through D16. A reference voltage Vref, which is provided by an external source, is applied to a non-inverting terminal (+) of the operational amplifier OP11. The operational amplifier OP11 compares a voltage applied to the inverting terminal and a voltage applied to the non-inverting terminal and outputs a voltage according to the result of the comparison. The voltage output by the operational amplifier OP11 may be a voltage with ripples removed therefrom by the ripple remover 236.

The ripple remover 236 includes first and second capacitors C11 and C12 which are connected in parallel, and a third resistor R60 which is connected to the first capacitor C11 in series. A first end of the ripple remover 236 is connected to the inverting terminal (−), and a second end of the ripple remover 236 is connected to an output terminal of the operational amplifier OP11. A first current balancing voltage VCB_R is provided to the LED driving circuit 200, as illustrated in FIG. 5.

A direct-type LCD, like the one illustrated in FIG. 1, has been described above in detail as an exemplary embodiment of the present invention. However, the present invention may be applied to an edge-type LCD (not shown) having a structure in which an LED array 172 is disposed on one side of an optical plate 142 that faces a PCB 135. Also, the present invention may be applied to an edge-type LCD having a structure in which first and second LED arrays are disposed on opposing sides of an optical plate 142.

As described above, according to the present invention, a current balancing circuit in a light source unit can minimize current differences between a plurality of LEDs.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A light source unit, comprising:
a printed circuit board which comprises an active region that emits light and an inactive region that accounts for a remainder of the printed circuit board;
a light emitting diode array which comprises a plurality of light emitting diodes that are arranged at regular intervals; and
a current balancing circuit which is disposed in the inactive region of the printed circuit board along a transverse direction, generates a plurality of current balancing voltages by uniformly adjusting current differences between the light emitting diodes, and outputs the current balancing voltages.

2. The light source unit of claim 1, wherein the light emitting diode array comprises a plurality of channels, each of the channels comprising a plurality of light emitting diodes that are connected in series.

3. The light source unit of claim 2, wherein each of the light emitting diodes comprises red, green, and blue sub-light emitting diodes.

4. The light source unit of claim 1, wherein:
a channel of light emitting diodes is provided with first through third forwarding voltages by an external source and outputs first through third light emitting diode voltages;
a plurality of red sub-light emitting diodes which are connected in series to one another in the channel emit light by being provided with the first forwarding voltage and output the first light emitting diode voltages;
a plurality of green sub-light emitting diodes which are connected in series to one another in the channel emit light by being provided with the second forwarding voltage and output the second light emitting diode voltages; and
a plurality of blue sub-light emitting diodes which are connected in series to one another in the channel emit light by being provided with the third forwarding voltage and output the third light emitting diode voltages.

5. The light source unit of claim 1, wherein the current balancing circuit generates first through third current balancing voltages by being provided with first through third light emitting diode voltages and uniformly adjusts current differences between the light emitting diodes, and outputs the first through third current balancing voltages.

6. The light source unit of claim 5, further comprising a light emitting diode driving circuit which compares the first through third current balancing voltages with a reference voltage, adjusts first through third forwarding voltages according to a comparison result, and feeds adjusted first through third forwarding voltages back to each of a plurality of channels of light emitting diodes.

7. The light source unit of claim 5, wherein the current balancing circuit comprises:
a first current balancing circuit which generates the first current balancing voltage by being provided with a plurality of the first light emitting diode voltages and uniformly adjusting current differences between a plurality of red sub-light emitting diodes;
a second current balancing circuit which generates the second current balancing voltage by being provided with a plurality of the second light emitting diode voltages and uniformly adjusting current differences between a plurality of green sub-light emitting diodes; and
a third current balancing circuit which generates the third current balancing voltage by being provided with a plurality of the third light emitting diode voltages and uniformly adjusting current differences between a plurality of blue sub-light emitting diodes.

8. The light source unit of claim 1, wherein the current balancing circuit comprises:
a first switching device, a base of which is provided with a first light emitting diode voltage via a first resistor and a collector of which is provided with a power supply voltage via a second resistor, the first switching device being turned on in response to the first light emitting diode voltage;
a plurality of second switching devices, bases of which are provided with a voltage of an emitter of the first switching device via third resistors, collectors of which are provided with one of the first light emitting diode voltage, a second light emitting diode voltage, and a third light emitting diode voltage, and emitters of which are respectively connected to first ends of a plurality of fourth resistors, the second switching devices being turned on in response to the voltage of the emitter of the first switching device; and
fifth and sixth resistors, first ends of which are connected to the emitter of the first switching device, the fifth and sixth resistors being connected in parallel to each other.

9. The light source unit of claim 8, wherein second ends of the fourth resistors are connected to a same node.

10. The light source unit of claim 8, wherein second ends of the fifth and sixth resistors are grounded.

11. The light source unit of claim 1, wherein the current balancing circuit comprises:
a first stage current mirror which comprises a plurality of first switching devices, first sources of which are provided with one of first, second, and third light emitting diode voltages and first gates of which are provided with whichever of the first, second, and third light emitting diode voltages is supplied to the first sources; and
a second stage current mirror which comprises a plurality of second switching devices, second sources of which are connected to first drains of the first switching devices and second gates of which are provided with a same voltage supplied to the second sources.

12. The light source unit of claim 1, wherein the current balancing circuit comprises:
a plurality of diodes, anodes of which are provided with one of first, second, and third light emitting diode voltages and cathodes of which are connected to a same node;
a plurality of first resistors, first ends of which are respectively connected to the anodes of the diodes and second ends of which are connected to a same node;
a second resistor, a first end of which is connected to the first resistors in series and a second end of which is grounded;
an operational amplifier, an inverting terminal of which is connected to the cathodes of the diodes and a non-inverting terminal of which is provided with a reference voltage, the operational amplifier comparing a voltage applied to the inverting terminal and the non inverting terminal and outputting a comparison result; and
a ripple remover, a first end of which is connected to the inverting terminal of the operational amplifier and a second end of which is connected to an output terminal of the operational amplifier.

13. The light source unit of claim 12, wherein the ripple remover comprises:
first and second capacitors which are connected in parallel; and
a third resistor which is connected to the first capacitor in series, first ends of the first and second capacitors being connected to each other and second ends of the first and second capacitors being connected to a first end of the third resistor.

14. The light source unit of claim 1, wherein the light emitting diode array is disposed on at least one side of the printed circuit board.

15. The light source unit of claim 1, wherein the light emitting diode array is disposed in the active region of the printed circuit board.

16. A liquid crystal display, comprising:
a liquid crystal panel assembly which comprises a liquid crystal panel that displays images and a first printed circuit board that generates a plurality of driving signals driving the liquid crystal panel and that provides the driving signals to the liquid crystal panel; and
a backlight unit which comprises a light source unit, the light source unit comprising a second printed circuit board which comprises an active region that emits light and an inactive region that accounts for a remainder of the second printed circuit board, a light emitting diode array which comprises a plurality of light emitting diodes that are arranged at regular intervals, and a current balancing circuit which is disposed in the inactive region of the second printed circuit board along a transverse direction, generates a plurality of current balancing voltages by uniformly adjusting current differences between the light emitting diodes, and outputs the current balancing voltages.

17. The liquid crystal display of claim 16, wherein the light emitting diode array comprises a plurality of channels, each of the channels comprising a plurality of light emitting diodes that are connected in series.

18. The liquid crystal display of claim 17, wherein each of the light emitting diodes comprises red, green, and blue sub-light emitting diodes.

19. The liquid crystal display of claim 16, wherein:
a channel of light emitting diodes is provided with first through third forwarding voltages by an external source and outputs first through third light emitting diode voltages;
a plurality of red sub-light emitting diodes which are connected in series to one another in the channel emit light by being provided with the first forwarding voltage and output the first light emitting diode voltages;
a plurality of green sub-light emitting diodes which are connected in series to one another in the channel emit light by being provided with the second forwarding voltage and output the second light emitting diode voltages; and
a plurality of blue sub-light emitting diodes which are connected in series to one another in the channel emit light by being provided with the third forwarding voltage and output the third light emitting diode voltages.

20. The liquid crystal display of claim 16, wherein the current balancing circuit generates first through third current balancing voltages by being provided with first through third light emitting diode voltages and uniformly adjusting current differences between the light emitting diodes, and outputs the first through third current balancing voltages.

21. The liquid crystal display of claim 20, further comprising a light emitting diode driving circuit which compares the first through third current balancing voltages with a reference voltage, adjusts first through third forwarding voltages according to a comparison result, and feeds adjusted first through third forwarding voltages back to each of a plurality of channels of light emitting diodes.

22. The liquid crystal display of claim 20, wherein the current balancing circuit comprises:
- a first current balancing circuit which generates the first current balancing voltage by being provided with a plurality of the first light emitting diode voltages and uniformly adjusting current differences between a plurality of red sub-light emitting diodes;
- a second current balancing circuit which generates the second current balancing voltage by being provided with a plurality of the second light emitting diode voltages and uniformly adjusting current differences between a plurality of green sub-light emitting diodes; and
- a third current balancing circuit which generates the third current balancing voltage by being provided with a plurality of the third light emitting diode voltages and uniformly adjusting current differences between a plurality of blue sub-light emitting diodes.

23. The liquid crystal display of claim 16, wherein the current balancing circuit is disposed at an upper portion or a lower portion of the inactive region of the second printed circuit board along the transverse direction.

24. The liquid crystal display of claim 16, wherein the current balancing circuit is disposed at both an upper portion and a lower portion of the inactive region of the second printed circuit board unit along the transverse direction.

25. The liquid crystal display of claim 16, wherein the light emitting diode array is disposed on at least one side of the second printed circuit board.

26. The liquid crystal display of claim 16, wherein the light emitting diode array is disposed in the active region of the second printed circuit board.

27. A method of minimizing current differences between a plurality of light emitting diodes in a light source unit, the light source unit including a printed circuit board having an active region, upon which the light emitting diodes are disposed in channels, and an inactive region, upon which a current balancing circuit is disposed along a transverse direction, the method comprising:
- providing forwarding voltages from a light emitting diode driving circuit to each channel of light emitting diodes;
- sending light emitting diode voltages from each channel of light emitting diodes to a current balancing circuit disposed on the inactive region of the printed circuit board;
- uniformly adjusting current differences between the light emitting diodes in the current balancing circuit;
- outputting current balancing voltages from the current balancing circuit to the light emitting diode driving circuit;
- comparing the current balancing voltages to a reference voltage in the light emitting diode driving circuit; and,
- controlling the forwarding voltages based on comparison of the current balancing voltages to the reference voltage in the light emitting diode driving circuit.

* * * * *